3,753,895
SEPARATION PROCESS FOR HIGH CARBON NUMBER STRAIGHT CHAIN HYDROCARBONS BY ADSORPTION
James O. Francis, Houston, Tex., assignor to Texaco Inc., New York, N.Y.
Filed Apr. 19, 1971, Ser. No. 135,104
Int. Cl. C07c 7/12; C10g 23/04
U.S. Cl. 208—310　　　　　　　　　　　　　　7 Claims

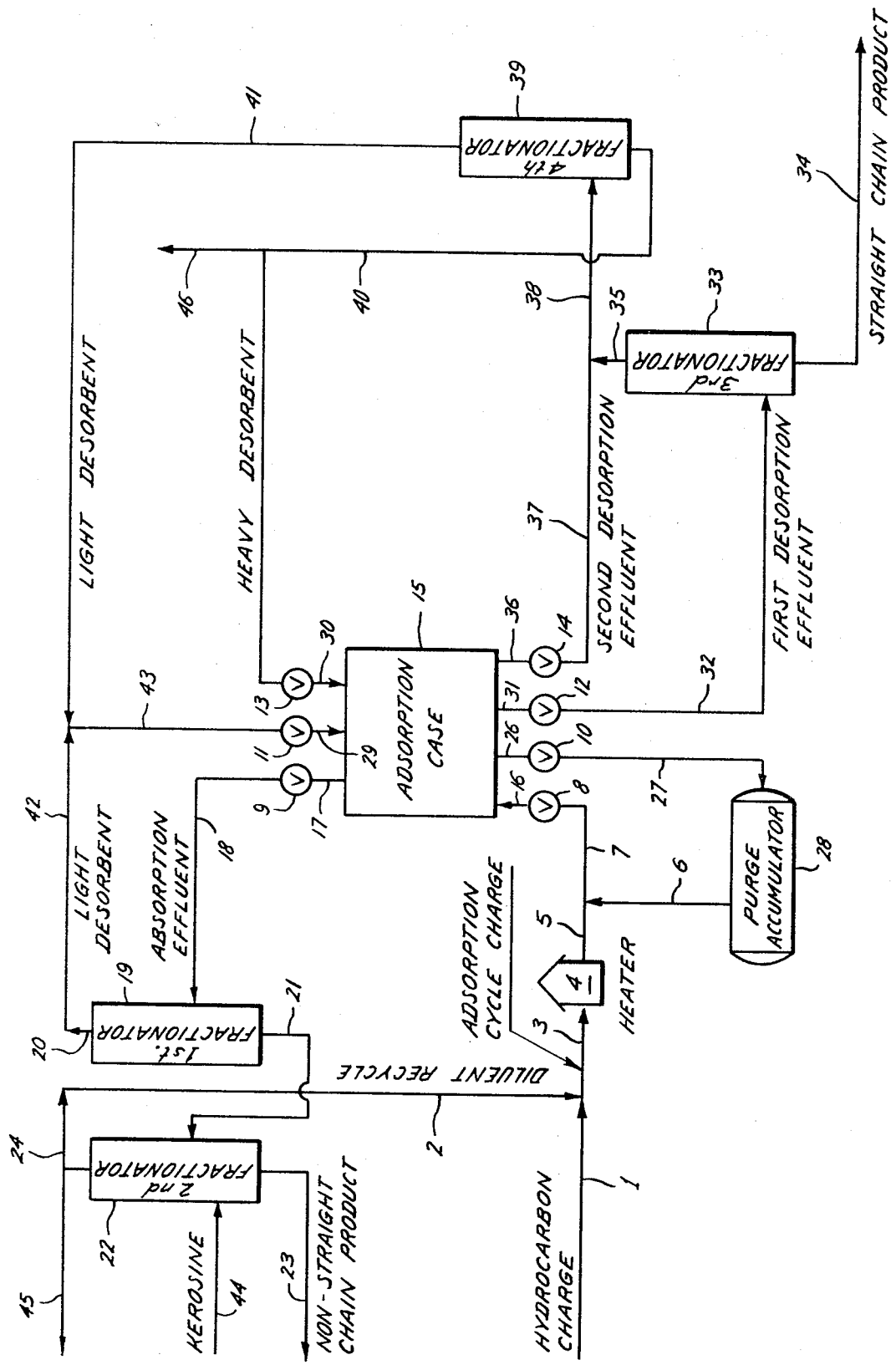

ABSTRACT OF THE DISCLOSURE

Straight chain hydrocarbons in the $C_{13}$–$C_{24}$ carbon number range are separated from a hydrocarbon mixture by selective adsorption into a molecular sieve adsorbent in a vapor phase adsorption step operated at an elevated pressure wherein the necessary operating temperature is maintained below 700° F. by adding sufficient low boiling hydrocarbon to maintain the dew point temperature of the hydrocarbon mixture between 575° F. and 650° F. Subsequently, the straight chain hydrocarbons are recovered by desorption from the molecular sieve adsorbent.

BACKGROUND OF THE INVENTION

Field of the invention

Methods of separating straight chain hydrocarbons from mixtures thereof with non-straight chain hydrocarbons employing molecular sieve selective adsorption processes are well known. The present invention is directed to an improved method for separating relatively high molecular weight straight chain hydrocarbons in the range of from about $C_{13}$ to about $C_{24}$ from a mixture of such hydrocarbons with non-straight chain hydrocarbons of corresponding carbon number in the vapor phase at an elevated temperature and superatmospheric pressure using an adsorbent selective for the adsorption of straight chain hydrocarbons as the adsorbing medium.

Prior art

It is known, for example, from Hess et al., U.S. 2,859,256 that molecular sieve selective adsorbents such as those disclosed in U.S. 2,882,243 can be used in separating straight chain hydrocarbons from mixtures thereof with non-straight chain hydrocarbons by adsorbing the straight chain components of the mixture in the pores of the selective adsorbent. It is also known, for example, from Ballard et al., U.S. 2,818,455, that the straight chain hydrocarbons adsorbed on the molecular sieve selective adsorbent can be desorbed therefrom using a gaseous hydrocarbon desorbing medium containing at least three carbon atoms per molecule. Also, from Senn, Ser. No. 561,182, filed June 28, 1966, now U.S. Pat. 3,395,097, it is known that straight chain hydrocarbons in the $C_{10}$ to $C_{24}$ range may be separated from mixtures thereof with non-straight chain hydrocarbons of the same carbon number range employing a molecular sieve selective adsorption process wherein the separation is effected in the vapor phase at an elevated temperature and a super atmospheric pressure using a molecular sieve selective adsorbent as the adsorbent.

SUMMARY OF THE INVENTION

The present invention is directed to an improved molecular sieve selective adsorption process comprising an adsorption cycle and a desorption cycle for the separation of $C_{13}$–$C_{24}$ range straight chain hydrocarbons from hydrocarbon mixtures having dew point temperatures above about 700° F. at the operating conditions of the selective adsorption process. More particularly, the method of the present invention provides a means for operating the adsorption cycle of such molecular sieve selective adsorption process in the vapor phase, at a superatmospheric pressure, and a temperature below about 700° F., wherein thermal cracking of hydrocarbons and coke deposition on the molecular sieve is substantially reduced compared to adsorption cycles wherein the temperature is above 700° F. The means of the present invention comprises mixing a low boiling diluent hydrocarbon with the $C_{13}$–$C_{24}$ straight chain containing hydrocarbon to form an adsorption cycle charge which has a dew point temperature below about 650° F. at the superatmospheric operating pressure of the adsorption cycle, subsequently vaporizing the adsorption cycle charge, than charging the vaporized adsorption cycle charge to the selective adsorption process at a temperature above the dew point temperature and below about 700° F.

In one preferred embodiment, the method of the present invention comprises an adsorption feed preparation step wherein the hydrocarbon mixture of straight chain and non-straight chain hydrocarbons in the $C_{13}$ to $C_{24}$ range is mixed with lower boiling diluent hydrocarbons comprising $C_{10}$–$C_{13}$ non-straight chain hydrocarbons in a ratio sufficient to reduce the dew point temperature of the resulting adsorption cycle charge mixture to a value below about 650° F.; an adsorption step wherein at a temperature between about 650° F. and 700° F. and a superatmospheric pressure, in the vapor phase, the adsorption cycle charge is contacted with a molecular sieve selective adsorbent to adsorb the $C_{13}$ to $C_{24}$ range straight chain hydrocarbon components of the mixture into the pores of said adsorbent; the adsorption step is terminated; a depressuring step wherein the pressure of the adsorption step is reduced to a value below that employed in the adsorption step; the depressuring step is discontinued; a purge step wherein the laden adsorbent is contacted with a light desorbent hydrocarbon (hereinafter further described) in vapor phase to remove surface adsorbed hydrocarbons and hydrocarbons in the void spaces of the bed therefrom; the purge step is terminated; a repressuring step wherein the adsorbent bed pressure is increased to a value greater than the pressure of the purge step; repressurization is terminated; a first desorption step wherein the adsorbed straight chain hydrocarbons are desorbed from the selective adsorbent with a heavy desorbent hydrocarbon vapor comprising at least one straight chain hydrocarbon having a carbon number in the range of $C_{10}$ to $C_{13}$ to remove some of said adsorbed $C_{13}$–$C_{24}$ straight chain hydrocarbon and also concommitantly adsorbing some of the $C_{10}$–$C_{13}$ straight chain hydrocarbon components of the heavy desorbent; and, in a second desorbing step contacting said selective adsorbent with a light desorbent hydrocarbon vapor comprising at least one straight chain hydrocarbon having a carbon number in the range of $C_6$ to $C_9$ to remove the adsorbed heavy desorbent from said selective adsorbent, terminating the second desorption step and repeating said operation in sequence.

DETAILED DESCRIPTION

The expression "surface adsorbed hydrocarbons" as used hereinabove includes all hydrocarbons adsorbed on the selective adsorbent other than within the molecular dimensioned pores of the selective adsorbent, including the non-normal compounds.

The method of the present invention is particularly adaptable to the production of straight chain hydrocarbons in the $C_{13}$ to $C_{24}$ range in excellent yields in a rapid, efficient and economical manner, wherein yield losses due to thermal cracking of the $C_{13}$ to $C_{24}$ hydrocarbons and coke deposition on the molecular sieve selective adsorbent are substantially reduced.

By the term "straight chain" hydrocarbons is meant any aliphatic or acrylic or open chain hydrocarbon which does not possess side chain branching. Representative straight chain hydrocarbons are the normal paraffins and the normal olefins, mono or polyolefins, including the straight chain acetylenic hydrocarbons. The "non-straight chain" hydrocarbons comprise the aromatic and napthenic hydrocarbons as well as the iso-paraffinic, iso-olefinic hydrocarbons and the like.

The petroleum fractions for which the present invention is particularly adaptable includes gas-oil fractions. A typical hydrocarbon fraction which may be treated for the removal of the straight chain hydrocarbon components therefrom might have, in the case of a gas-oil fraction a boiling point in the range of about 400 to 650° F. and may contain a substantial amount of straight chain hydrocarbons, e.g., 15 to 25 percent by weight or more. A particularly desirable petroleum fraction is the middle cut of a gas-oil which comprises hydrocarbons in the $C_{13}$ to $C_{18}$ range. Such a petroleum fraction is conventionally prepared by subjecting a gas-oil or a kerosine gas-oil mixture to fractional distillation wherein lower boiling and higher boiling hydrocarbons are separated from the desired boiling range petroleum fraction.

In the practice of this invention, any solid, selective adsorbent capable of adsorbing the straight chain hydrocarbon component of the hydrocarbon feed mixture to the substantial exclusion of non-straight chain hydrocarbons is suitable. Preferably the selective adsorbent is selected from certain natural or synthetic alumino-silicate zeolites which exhibit the properties of molecular sieves, that is, matter made up of porous crystals wherein the pores of the crystals are of molecular dimension and are of uniform size. The structure of such crystalline zeolite alumino-silicate molecular sieves is well described in Mays et al., U.S. Pat. 3,069,363. Suitable synthetic and natural alumino-silicate zeolite molecular sieves for use in this process include those which when dehydrated may be described as crystalline zeolites having a rigid three-dimensional anionic network and having interstitial dimensions sufficiently large to adsorb straight chain hydrocarbons but sufficiently small to exclude non-straight chain hydrocarbons. The naturally occurring zeolite, chabozite, exhibits such properties. Naturally occurring or synthetically prepared analcite, phacolite, gmelinite, harmotome and the like or, suitable base exchange modifications of these are also suitable.

Other solid selective adsorbents may be employed in the practice of this invention. For example, it is contemplated that selective adsorbents having the property of selectively adsorbing straight chain hydrocarbons may be obtained by suitable treatment of various oxide gels, especially metal oxide gels of the polyvalent amphoteric metal oxides. Other solid adsorbents which selectively adsorb straight chain hydrocarbons to the substantial exclusion of non-straight chain hydrocarbons are also known.

A particularly suitable molecular sieve selective adsorbent for use in the present invention is a calcium substituted sodium alumino-silicate crystalline zeolitic molecular sieve having a pore size or opening of about 5 A. units. This particular molecular sieve has the ability to adsorb straight chain hydrocarbons to the substantial exclusion of non-straight chain hydrocarbons.

The method of the present invention is designed for vapor phase operation and under essentially iso-thermal conditions. The particular operating conditions selected are dependent on the nature of the adsorption cycle charge to the adsorption cycle, the carbon number range of the adsorption cycle charge and desired product stream as well as the carbon number distribution (relative amounts of each carbon number) within the range, the straight chain hydrocarbon content of the adsorption cycle charge and the olefinic, sulfur, nitrogen and aromatic compounds content thereof. In general, the adsorption cycle charge preferably should be relatively low in olefins, sulfur, nitrogen and aromatic content and these impurities can be readily reduced to acceptable limits or removed in a manner well known in the art such as by mild hydrogenation involving mild catalytic reforming. In addition, the feed stream should be free from the lower molecular weight hydrocarbon such as in the range from about $C_1$ to about $C_9$. Such hydrocarbons complicate recovery of the gaseous materials employed in the desorption cycle of the present invention.

The particular adsorption temperature used varies with the type of charge stock, carbon number content thereof, and desired range of straight chain hydrocarbons to be recovered from the charge stock. However, it is necessary to carry out the adsorption cycle at a temperature above the dew point of the vaporized feed stream to minimize surface adsorption of the non-straight chain hydrocarbon on the selective adsorbent and also to decrease the holdup of the charge stock in the sieve voids. A further requirement, which controls the upper temperature limit of the adsorption cycle, is the need to avoid cracking of the charge stock. Keeping in mind these lower and upper temperature limitations, it has been found that a temperature range of about 575° F. to about 700° F. in the adsorption cycle will permit satisfactory operation. A preferred temperature range for the adsorption cycle is from about 600° F. to about 675° F. Preferably, the adsorption cycle should be operated at about 50° F. above the adsorption cycle charge dew point temperature to ensure that vapor condensation does not occur in the capillaries of the selective adsorbent.

In the adsorption cycle, the operating pressure should be maintained at a positive pressure above atmospheric pressure to permit the selective adsorbent to adsorb an additional quantity of the desired straight chain hydrocarbon components of the feed during the adsorption cycle. It has been found that by maintaining the operating pressure at a pressure of between 5 and 70 p.s.i.g. during the adsorption cycle affords good results in terms of rapid adsorption of the adsorbable component of the feed by the selective adsorbent.

Hydrocarbon charge stocks suitable for use in the method of the present invention comprise gas-oil range hydrocarbons boiling in the range of from about 400° F. to about 650° F. which contain a substantial amount of straight chain hydrocarbons. Such hydrocarbon charge stock comprises hydrocarbons in the $C_{13}$ to $C_{24}$ carbon number range. At the desired adsorption operating pressure, the dew point of such a hydrocarbon charge stock exceeds 650° F. and is in a temperature range wherein substantial thermal cracking of the hydrocarbon stock will occur. Accordingly, in the method of the present invention, a low boiling diluent hydrocarbon is mixed with the hydrocarbon charge stock in sufficient amount to lower the dew point of the resulting mixture (hereinafter called the adsorption charge stock) below 650° F. at the adsorption operating pressure and preferably in the range of from 550° F. to 625° F. Additionally, the boiling point of the diluent hydrocarbon must be sufficiently high so that it may be separated from a light desorbent as will hereinafter be described. The diluent hydrocarbon may comprise a kerosene range hydrocarbon boiling in the range from about 325° F. to about 550° F. which contains a high portion of non-straight chain components. Preferably the diluent hydrocarbon comprises non-straight chain hydrocarbons in the $C_{10}$–$C_{13}$ carbon number range. Such a material which is useful as diluent hydrocarbon may be conveniently obtained by fractional distillation of kerosene and the subsequently recovery of a fraction within the desired boiling range.

The amount of diluent hydrocarbon which must be added to the hydrocarbon charge stock in order to obtain an adsorption charge material of the desired dew point will depend on the boiling range of the hydrocarbon charge stock, the boiling range of the diluent hydrocarbon used, the pressure employed in the adsorption step and the selected dew point temperature. Thus, for each situation the amount of diluent added will vary. However, given the particular conditions, it is not difficult to determine the proper amount of diluent to add to the hydrocarbon charge stock. Example I below shows the dew point lowering effect obtained by adding diluent hydrocarbon to a hydrocarbon charge stock under conditions within the operating range of the adsorption step.

EXAMPLE I

A hydrocarbon charge suitable for use in a hydrocarbon separation process for production of $C_{13}$–$C_{24}$ hydrocarbons had a dew point temperature of 700° F. at 45 p.s.i.a. Sufficient diluent hydrocarbon was added to the hydrocarbon charge to produce an adsorption step charge stock with a dew point temperature of 625° F. at 45 p.s.i.a. The table below shows the relative amounts of hydrocarbon charge and diluent hydrocarbon employed to obtain the desired reduction in dew point.

|  | Hydrocarbon charge, pounds | Diluent hydrocarbon, pounds | Adsorption step charge, pounds |
|---|---|---|---|
| Component: |  |  |  |
| $iC_{10}$ |  | 5.3 | 5.3 |
| $nC_{10}$ |  | 1.7 | 1.7 |
| $iC_{11}$ |  | 11.5 | 11.5 |
| $nC_{11}$ |  | 3.0 | 3.0 |
| $iC_{12}$ |  | 17.8 | 17.8 |
| $nC_{12}$ |  | 4.1 | 4.1 |
| $iC_{13}$ |  | 1.6 | 1.6 |
| $nC_{13}$ | 0.5 |  | 0.5 |
| $iC_{14}$ | 13.0 |  | 13.0 |
| $nC_{14}$ | 2.0 |  | 2.0 |
| $iC_{15}$ | 19.0 |  | 19.0 |
| $nC_{15}$ | 2.5 |  | 2.5 |
| $iC_{16}$ | 16.0 |  | 16.0 |
| $nC_{16}$ | 3.0 |  | 3.0 |
| $iC_{17}$ | 18.0 |  | 18.0 |
| $nC_{17}$ | 3.0 |  | 3.0 |
| $iC_{18}$ | 10.5 |  | 10.5 |
| $nC_{18}$ | 3.0 |  | 3.0 |
| $iC_{19}$ | 6.0 |  | 6.0 |
| $nC_{19}$ | 1.3 |  | 1.3 |
| $iC_{20}$ | 1.7 |  | 1.7 |
| $nC_{20}$ | 0.5 |  | 0.5 |
| Total | 100.0 | 45 | 145 |
| Dew point, °F | 700 | 475 | 625 |
| Pressure, p.s.i.a. | 45 | 45 | 45 |

According to the process of the present invention, a hydrocarbon charge comprising $C_{13}$–$C_{24}$ straight chain hydrocarbons is mixed with a low boiling diluent hydrocarbon as hereinabove described preferably comprising $C_{10}$–$C_{13}$ non-straight chain hydrocarbons to form an adsorption cycle charge which has a dew point temperature of from about 575° F. to about 650° F. at the selected adsorption cycle operating pressure. This adsorption cycle charge is vaporized at the adsorption cycle operating pressure. Preferably, the adsorption cycle charge is superheated from about 25° F. to about 50° F. above its dew point temperature. The vaporized adsorption cycle charge is brought into contact with a selective adsorbent in an adsorption cycle wherein the straight chain hydrocarbon components of the adsorption cycle charge are adsorbed into the selective adsorbent and the unadsorbed portion of the adsorption cycle charge is separated from the selective adsorbent.

Subsequent to the adsorption cycle, the selective adsorbent containing adsorbed straight chain hydrocarbons is subjected to a desorption cycle wherein the straight chain hydrocarbons are desorbed from the selective adsorbent. Any effective desorption method may be used within the contemplation of this invention. For example, the desorption process disclosed in Senn, U.S. Pat. 3,395,097 is particularly effective for desorbing straight chain hydrocarbons in the $C_{13}$–$C_{24}$ carbon number range.

In one embodiment of the present invention, the selective adsorbent may be contained in an adsorbent case. Vaporized adsorbent cycle charge may be flowed into the adsorbent case and the unadsorbed portion of the adsorption cycle charge (hereinafter called adsorption effluent) flowed from the adsorption case during the adsorption cycle. The adsorption effluent comprises $C_{13}$–$C_{24}$ non-straight chain hydrocarbons, $C_{10}$–$C_{13}$ non-straight chain components of the diluent hydrocarbon, and other hydrocarbons which may remain in the adsorption case from a previous desorption cycle. The adsorption effluent recovered from the adsorbent case may then be subjected to a fractional distillation step to separate the $C_{10}$–$C_{13}$ diluent hydrocarbon from the adsorption effluent. The separated diluent hydrocarbon may then be recycled for mixing with the hydrocarbon charge containing $C_{13}$–$C_{24}$ straight chain hydrocarbons to form the adsorbent cycle charge.

Advantagtously, a kerosene stream comprising $C_{10}$–$C_{13}$ non-straight chain hydrocarbons may be added to the fractionation step wherein the $C_{10}$–$C_{13}$ components of the kerosene stream may be recovered with the diluent hydrocarbon. By this means of adding a kerosene stream to the fractionation step, sufficient diluent hydrocarbon may be available for mixture with the hydrocarbon charge to form an adsorption cycle charge with a desired dew point temperature in the range of from about 575° F. to about 650° F. at the selection adsorption cycle operating pressure. Aditionally, excess kerosene may be added thereby creating an excess diluent hydrocarbon recycle over that required to form the adsorption cycle charge. This excess diluent hydrocarbon recycle may be conveniently separated from the system as a bleed stream. The advantage of such a diluent hydrocarbon bleed stream is that undesirable materials, such as cracked hydrocarbons, which may accumulate in the diluent hydrocarbon recycle may be conveniently removed.

For a better understanding of the present invention, a process employing said invention is described below with reference to FIG. I of the attached drawing.

BRIEF DESCRIPTION OF THE DRAWING

The attached drawing illustrates a schematic flow diagram of one method for carrying out the present invention.

DETAILED DESCRIPTION OF THE DRAWING

The attached drawing is a schematic flow diagram of one method for carrying out the process of the present invention. Many pumps, intermediate tanks, valves and other items not necessary to the explanation of the present invention have been omitted. To one skilled in the art, the addition of such pumps, intermediate tanks, valves and other items in appropriate places will be obvious.

A gas-oil range hydrocarbon feed mixture of straight chain and non-straight chain hydrocarbons in the $C_{13}$ to $C_{24}$ range in line 1 is mixed with diluent hydrocarbon comprising $C_{10}$–$C_{13}$ non-straight chain hydrocarbons (hereinafter further described) via line 2 in such a ratio that the dew point of the resulting adsorption cycle charge at the process operating pressure is reduced to from about 525° F. to about 650° F. This adsorption cycle charge is transferred via line 3 to the charge heater 4. In the charge heater the adsorption cycle charge is vaporized. The adsorption cycle charge passes from the charge heater via line 5 and is mixed with purge drum vapor (hereinafter further described) via line 6 to form an adsorption charge mixture in line 7.

During the adsorption step, valves 8 and 9 are open, valves 10, 11, 12, 13 and 14 are closed. The adsorption charge mixture passes from line 7 through valve 8, thence via line 16 into an adsorption case 15. The adsorption case 15 is maintained at a temperature between about 600° F. and about 700° F. and a pressure of from about 5 p.s.i.g. to about 70 p.s.i.g. The adsorption case contains a bed of molecular sieve selective adsorbent. In the adsorption case 15, the $C_{13}$ to $C_{24}$ range straight chain hydrocarbon component of the adsorbent charge mixture is selectively adsorbed by the selective adsorbent. An adsorption effluent stream comprising non-straight chain hydrocarbons and diluent hydrocarbons as well as a light desorbent comprising straight chain hydrocarbons in the $C_6$ to $C_9$ range (hereinafter further described) present in the sieve pores from a previous desorption step, exits the adsorption case 15 via line 17. From line 17 the adsorption effluent passes through valve 9 into line 18. The adsorption effluent passes via line 18 into the first fractional distillation column 19. In the fractional distillation column 19, light desorbent is separated from the adsorption effluent and is recovered as an overhead product via line 20. The remainder of the adsorption effluent is recovered from the first fractionation column 19 as a bottoms product and is transferred via line 21 to the second fractional distillation column 22. In the second fractional distillation column 22 the $C_{13}$ to $C_{24}$ range non-straight chain hydrocarbons are separated from the diluent hydrocarbon which comprises $C_{10}$ to $C_{13}$ hydrocarbons. The $C_{13}$ to $C_{18}$ gas-oil non-straight chain hydrocarbons are recovered from the second fractionation column 22 as a bottoms product via line 23. Diluent hydrocarbon is recovered from the second fractionation column 22 via line 24. Diluent hydrocarbon passes from line 24 into line 2. As hereinbefore described the diluent hydrocarbon is mixed with the $C_{13}$ to $C_{18}$ range hydrocarbon charge in order that the resulting mixture will have a dew point of about 650° F. or less at the adsorption cycle operating pressure. Make-up diluent hydrocarbon is supplied to the process by flowing a kerosene stream via line 44 to the second fractionation column 22. The $C_{10}$–$C_{13}$ range components of the kerosene stream are recovered along with the diluent hydrocarbon via line 24. Excess diluent hydrocarbon which may result from the addition of the kerosene stream is vented from line 24 via line 45. A minor portion of the fraction of the kerosene stream which is recovered with the diluent hydrocarbon comprises $C_{10}$–$C_{13}$ straight chain hydrocarbons. These $C_{10}$–$C_{13}$ straight chain hydrocarbons are adsorbed upon the selective adsorbent during the adsorption step.

At the end of the adsorption step the depressuring step begins. Valve 10 is opened and valves 8, 9, 11, 12, 13 and 14 are closed. In the depressuring step, the adsorption case 15 is depressured to a pressure between about atmospheric and about 10 p.s.i.g. by venting unadsorbed adsorption charge mixture via line 26 through valve 10 into line 27. From line 27 the vented material enters the purge accumulator 28, the purge accumulator being maintained at about atmospheric pressure. A portion of the surface adsorbed hydrocarbons and unadsorbed hydrocarbons are removed from the adsorbent case during the depressuring step. When the adsorption case is depressured to the desired lower pressure, the purge step begins.

In the purge step, valves 10 and 11 are open, and valves 8, 9, 12, 13 and 14 are closed. A hot, vaporized stream of light desorbent (as hereinafter described) from valve 11 passes via line 29 into the adsorption case 15 in a direction counter-current to the flow of adsorbent charge during the adsorption step. The purge step is preferably carried out at substantially the same temperature as the adsorption and depressuring steps, and the pressure obtained in the depressuring step. The light desorbent displaces any remaining portion of the charge stock from the adsorption vessel and also removes the surface adsorbed non-straight chain hydrocarbon components from the selective adsorbent. In the purge step it is necesary to maintain light desorbent in the vapor phase for efficient operation and the flow rate thereof at a value between about 0.2 and 6.0 purge volumes to minimize removal of the pore adsorbed straight chain hydrocarbon components of the feed stream and to maximize removal of the surface adsorbed and the bed entrapped, undesirable components. The term "purge volume" refers to the amount of the light desorbent in the purge effluent stream per cycle and is equivalent to one vapor volume displacement (at purge conditions) of the total volume occupied by the sieve bed. Most efficient operations are conducted using a purge volume range of from 0.8 to 2.0 purge volumes when it is desired to attain very high straight chain hydrocarbon product purity. A purge effluent stream comprising light desorbent, unadsorbed adsorption charge mixture and desorbed hydrocarbons is withdrawn via line 26 during the purge step. The purge effluent in line 26 passes through valve 10 into line 27. From line 27 the purge effluent enters the purge accumulator 28. At the end of the purge step a repressuring step is begun.

In the repressuring step valve 13 is opened and valves 8, 9, 10, 11, 12 and 14 are closed. A stream of heavy desorbent (as hereinafter described) from valve 13 enters the adsorption case 15 via line 30 to increase the pressure in the adsorption case 15 to a pressure advantageously from about 1 to 20 p.s.i.g., and preferably from 5 to 15 p.s.i.g. above the adsorption step pressure. When the selected pressure is obtained in adsorption case 15, the first desorption step begins.

In the first desorption step valves 12 and 13 are open and valves 8, 9, 10, 11 and 14 are closed. A vaporized stream of heavy desorbent comprising straight chain hydrocarbons in the $C_{10}$ to $C_{13}$ carbon number range is introduced from valve 13 via line 30 into the adsorption case 15. The flow of heavy desorbent vapor is counter-current to flow during the adsorption step. The heavy desorbent vapor effects removal of the pore adsorbed straight chain hydrocarbon component of the adsorption cycle charge from the selective adsorbent. In addition, light desorbent which may be adsorbed by the selective adsorbent during the purge step, and residual light desorbent in the sieve voids will be recovered. The resulting first desorption effluent comprising heavy desorbent, light desorbent and $C_{13}$ to $C_{24}$ range straight chain hydrocarbons flows from the adsorption case 15 via line 31 through valve 12 into line 32. From line 32 the first desorption effluent passes into the third fractionation column 33 wherein a mixture of light desorbent and heavy desorbent is separated from $C_{13}$ to $C_{24}$ range straight chain hydrocarbon. A product stream comprising $C_{13}$ to $C_{24}$ range straight chain hydrocarbons is recovered from the third fractionation column 33 via line 34. The desorbent mixture is recovered from the third fractionation column 33 via line 35. At the end of the first desorption step, the selective adsorbent should contain a minor amount (below 50 percent) of adsorbed $C_{13}$ to $C_{24}$ straight chain hydrocarbons and a major amount (over 50 percent) of the straight chain heavy desorbent. Upon termination of the first desorption step, the second desorption step begins.

During the second desorption step, valves 11 and 14 are open and valves 8, 9, 10, 12 and 13 are closed. In the second desorption step a vaporized stream of light desorbent comprising straight chain hydrocarbons in the carbon number range of from $C_6$ to $C_9$ enters through valve 11 via line 29 into the adsorption case 15 in a direction of flow countercurrent to adsorption step flow. The light desorbent displaces heavy desorbent from the adsorbent pores, and a second desorption effluent stream comprising over 50 percent light desorbent and below 50 percent heavy desorbent flows from the adsorption case 15 via line 36 through valve 14 into line 37. A portion of the light desorbent is itself adsorbed into the vacated adsorbent pores. At the end of the second desorption step, another adsorption step begins.

The second desorption effluent from line 37 passes into line 38. The desorbent mixture from line 35 passes into line 38. From line 38, the second desorbent effluent and the desorbent mixture pass into the fourth fractionation column 39 wherein the mixture is separated into a heavy desorbent stream and a light desorbent stream. The heavy desorbent stream is recovered from the fourth fractionation column 39 via line 40 and is returned to valve 13. From valve 13 the heavy desorbent is admitted into the adsorption case 15 as required during the repressurization step and the first desorption step. The $C_{10}$–$C_{13}$ straight chain components of the kerosene stream adsorbed upon the selective adsorbent during the adsorption step are desorbed and recovered along with the heavy desorbent.

Excess heavy desorbent which may build up due to the added straight chain components is vented from line 40 via line 46.

Light desorbent recovered from the fourth fractionation column 39 via line 41 passes into line 43. Light desorbent recovered from the first fractionation column 19 via line 20 passes via line 42 into line 43. Line 43 carries this light desorbent recycle to valve 11 through which light desorbent is admitted to the adsorption case 15 during the purge step and second desportion step as hereinbefore described.

The method for recovering $C_{13}$-$C_{24}$ straight chain hydrocarbons from the selective adsorbent as shown in the attached drawing and described in the detailed description of the drawing utilizes two desorption steps so as to effect removal (desorption) of such hydrocarbons in a rapid, efficient manner. The advantages of this method of operation are particularly well set out in Senn, Ser. No. 561,182, filed June 28, 1966, now U.S. Pat. 3,395,097.

One advantage of the improvement of the present invention is that the adsorption charge stock has a dew point temperature below about 650° F. and preferably between about 550° F. and 625° F. at the operating pressure of the adsorption step. Consequently, an adsorption step temperature below about 700° F. may be utilized, thereby minimizing thermal cracking of the hydrocarbon charge stock. By following the improvement of the present invention wherein low boiling diluent hydrocarbons are mixed with the $C_{13}$ to $C_{24}$ range hydrocarbon charge stock in such an amount that the dew point of the resulting mixture is below about 650° F., cracking of the $C_{13}$ to $C_{24}$ range hydrocarbon is substantially reduced when such mixture is vaporized for adsorption charge stock. If low boiling hydrocarbons are not mixed with the $C_{13}$ to $C_{18}$ range hydrocarbons prior to vaporization at the adsorption step pressure, the dew point of the resulting vapor is substantially above 650° F., i.e., in the range of 650° F. to about 750° F. Such temperatures are within the range where substantial cracking of $C_{13}$ to $C_{24}$ hydrocarbons will occur. The cracking of the $C_{13}$ to $C_{24}$ range hydrocarbons results in a loss of desired straight chain products.

During operation of a hydrocarbon separation process wherein straight chain hydrocarbons are adsorbed upon a selective adsorbent, carbonaceous deposits (hereinatfer referred to as coke) form on the surfaces and within the pores of the selective adsorbent. The presence of these coke deposits reduce the capacity of the selective adsorbent to adsorb straight chain hydrocarbons and, periodically, the coke must be removed to restore the adsorptive capacity of the selective adsorbent. Coke is apparently formed by the reaction of certain hydrocarbons such as olefinic hydrocarbons to form high molecular weight hydrocarbons which collect upon the selective adsorbent. The rate of coke formation increases with increasing adsorption step temperatures and with increasing concentrations of cracked hydrocarbons in the adsorption step charge. The method of the present invention for depressing the adsorption step charge dew point temperature has the additional advantage of extending the periods between coke removal steps. This is accomplished by depressing the adsorption step dew point temperature which allows lower adsorption step operating temperatures. The lower adsorption step operating temperatures reduce the rate of coke deposition.

EXAMPLE II

To demonstrate the effectiveness of the present invention inreducing thermal cracking of hydrocarbons and the rate of coke deposition, a process essentially the same as shown in the attached drawing is set up and placed in operation. A light desorbent comprising normal heptane and a heavy desorbent comprising normal $C_{10}$-$C_{13}$ hydrocarbons are employed in this operation. The selective adsorbent is Linde Type 5A molecular sieve. The adsorption step operating pressure is 45 p.s.i.a. The hydrocarbon charge and diluent hydrocarbon are the same as is described in Example I above.

In a first run, hydrocarbon charge, without diluent hydrocarbon, is charge to the adsorption step in the vapor phase at about 750° F., which is about 50° F. above the hydrocarbon charge dew point temperature . The results of this first run are that about 0.2 wt. percent of the hydrocarbon charge is thermally cracked at the 750° F. temperature and the adsorptive capacity of the selective adsorbent for straight chain hydrocarbons is reduced from about 3.0 wt. percent to about 0 wt. percent within about 24 hours due to coke deposition.

In a second run, hydrocarbon charge and diluent hydrocarbon are mixed in proportions to produce an adsorption charge as is described in Example I. The adsorption charge is fed to the adsorption step at about 675° F., which is about 50° F. above the adsorption charge dew point temperature. The results of this second run are that about 0.05 wt. percent of the adsorption charge is thermally cracked at 675° F., and the adsorptive capacity of the selective adsorbent for straight chain hydrocarbons is reduced from about 3.0 wt. percent to about 1½ wt. percent within about 360 hours due to coke deposition.

From a comparison of the results of the first and second runs it can be seen that operating the adsorption step at a lower temperature produces less cracking of the hydrocarbon charge and less coke deposition on the selective adsorbent, thereby demonstrating the advantage of the present invention.

Obviously, many modifications and variations of the invention as hereinbefore set forth may be made without departing from the spirit and scope thereof, and therefore only such limitations should be imposed as are indicated in the appended claims.

I claim:

1. In a vapor phase method for separating $C_{13}$-$C_{24}$ range straight chain hydrocarbons from a hydrocarbon feed mixture thereof with non-straight chain hydrocarbons in an adsorption zone using a molecular sieve selective adsorbent, wherein a diluent hydrocarbon is added to said hydrocarbon feed mixture for reducing the feed mixture dew point temperature to the range of from about 550° F. to about 650° F. at an adsorption cycle pressure of from about 5 p.s.i.g. to about 70 p.s.i.g., wherein $C_{13}$-$C_{24}$ straight chain hydrocarbons are adsorbed upon said selective adsorbent in an adsorption cycle at a selected pressure of from about 5 p.s.i.g. to about 70 p.s.i.g., and a temperature from about 25° F. to about 50° F. higher than the dew point temperature of said hydrocarbon feed mixture, wherein, after terminating said adsorption cycle said selective adsorbent containing adsorbed $C_{13}$-$C_{24}$ range straight chain hydrocarbons is contacted with a heavy desorbent vapor in a first desorption cycle for desorbing a portion of said $C_{13}$-$C_{24}$ range straight chain hydrocarbons, and adsorbing a portion of said heavy desorbent vapor and wherein, after terminating said first desorption cycle, said selective adsorbent containing adsorbed $C_{13}$-$C_{24}$ straight chain hydrocarbons and adsorbed heavy desorbent is contacted with a light desorbent vapor, in a second desorption cycle, for desorbing adsorbed $C_{13}$-$C_{24}$ range hydrocarbons and heavy desorbent from said selective adsorbent and adsorbing light desorbent into said selective adsorbent, the improvement which comprises (a) Employing, as diluent, hydrocarbons comprising $C_{10}$-$C_{13}$ range non-straight chain hydrocarbons;
(b) Employing $C_{10}$-$C_{13}$ range straight chain hydrocarbon as heavy desorbent; and
(c) Employing $C_6$-$C_9$ range straight chain hydrocarbon as light desorbent.

2. The method of claim 1 wherein during said adsorption cycle, an adsorption cycle effluent comprising unadsorbed $C_{13}$-$C_{24}$ range non-straight chain hydrocarbons, $C_{10}$-$C_{13}$ range diluent hydrocarbons, and desorbed $C_6$-$C_9$ range straight chain hydrocarbon light desorbent is recovered from said adsorption zone, wherein said adsorption effluent is fractionated, in a first fractionation zone, into a first product stream comprising $C_{13}$–$C_{24}$ range non-straight chain hydrocarbon product stream, a diluent hydrocarbon recycle stream comprising $C_{10}$–$C_{13}$ range hydrocarbons and a first light desorbent recycle stream comprising $C_6$–$C_9$ range straight chain hydrocarbons for recycle as light desorbent.

3. The method of claim 2 wherein a minor portion of said hydrocarbon feed mixture is cracked into lower molecular weight hydrocarbons and wherein a minor portion of said diluent hydrocarbon recycle stream is removed from the separation process for control of said cracked hydrocarbons.

4. The method of claim 3 wherein said $C_{10}$–$C_{13}$ range diluent hydrocarbon comprises straight chain and non-straight chain hydrocarbons.

5. The method of claim 4 wherein, upon termination of said adsorption cycle, said selective adsorbent is vented to a purge accumulation zone, and wherein said selective adsorbent is purged with light desorbent vapor to said purge accumulation zone for removal of unadsorbed hydrocarbon feed mixture prior to said first desorption cycle, and wherein hydrocarbon from said purge accumulation zone is added to said adsorption cycle hydrocarbon feed mixture.

6. The method of claim 5 wherein a portion of $C_{10}$–$C_{13}$ range straight chain hydrocarbons are adsorbed into said selective adsorbent in said adsorption cycle, wherein said $C_{10}$–$C_{13}$ range straight chain hydrocarbons are desorbed from said selective adsorbent in said first desorption cycle and said second desorption cycle.

7. The method of claim 6 wherein an effluent from said first desorption cycle and an effluent from said second desorption cycle, each comprising $C_6$–$C_9$ range straight chain hydrocarbons, $C_{10}$–$C_{13}$ range straight chain hydrocarbons and $C_{13}$–$C_{24}$ range straight chain hydrocarbons are fractionated, in a second fractionation zone, into a second product stream comprising $C_{13}$–$C_{24}$ range straight chain hydrocarbons, a heavy desorbent recycle stream comprising $C_{10}$–$C_{13}$ range straight chain hydrocarbons and a second light desorbent recycle stream comprising $C_6$–$C_9$ range hydrocarbons.

References Cited

UNITED STATES PATENTS

| | | | |
|---|---|---|---|
| 3,395,097 | 7/1968 | Senn | 208—310 |
| 2,975,222 | 3/1961 | Findlay | 260—676 MS |
| 3,284,346 | 11/1966 | Anstey et al. | 208—310 |
| 3,422,005 | 1/1969 | Avery | 208—310 |
| 3,373,103 | 3/1968 | Cooper et al. | 208—310 |

HERBERT LEVINE, Primary Examiner

U.S. Cl. X.R.

260—676 MS